10

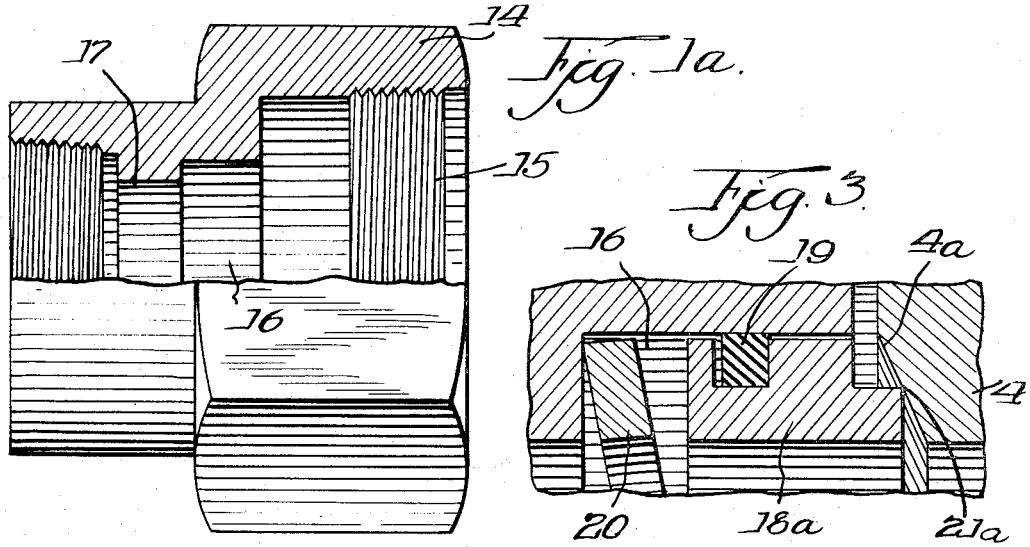
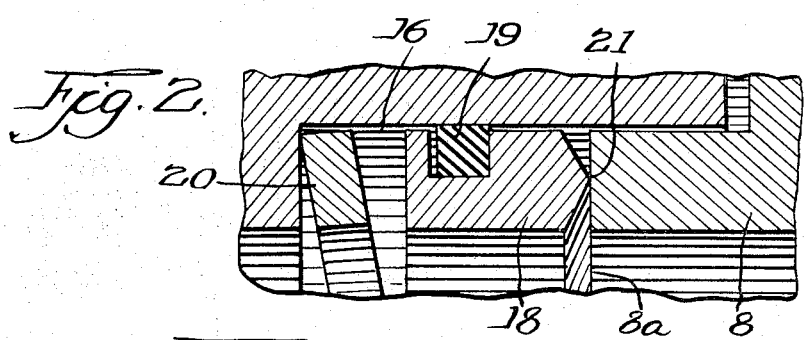
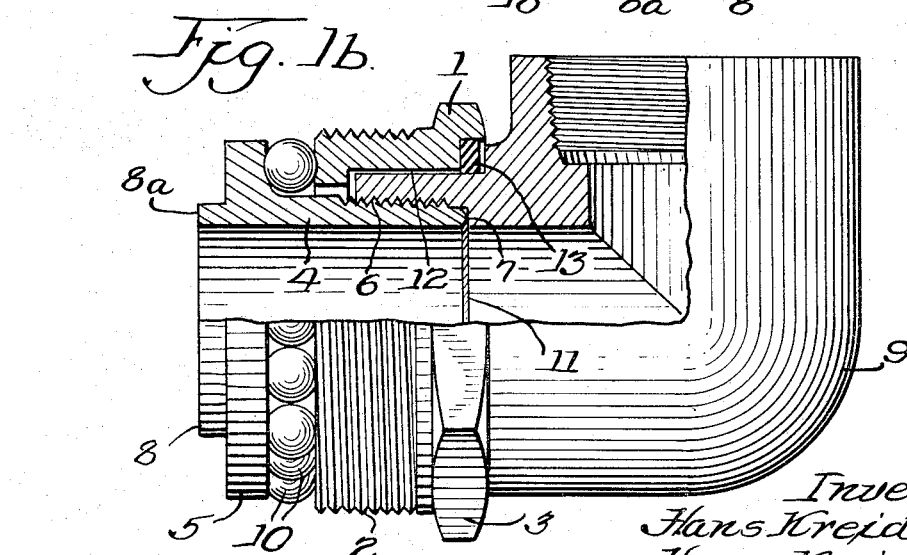

United States Patent Office 3,339,946
Patented Sept. 5, 1967

3,339,946
BALL BEARING SWIVEL PIPE JOINT OR COUPLING
Hans Kreidel, Sr., and Hans Kreidel, Jr., Wiesbaden, Germany, assignors to Inventex Ltd. (formerly Inventex A.G.), Aargau, Switzerland, a Swiss company
Filed Mar. 20, 1964, Ser. No. 353,326
Claims priority, application Germany, Apr. 3, 1963, K 49,369
3 Claims. (Cl. 285—272)

The invention relates generally to swivel pipe joints, and more particularly to a ball bearing swivel pipe joint or coupling. Ball bearing swivel pipe joints of the type here involved are utilized for the connection of pipe lines to container bodies and the like, as well as interconnecting pipe lines having stationary and movable sections. The requirements and characteristics for swivel joints are varied depending upon the medium to be conveyed, pressure and temperature involved, the amount of movement or rotation necessary, and in some cases the speed of rotation. Difficulties arise particularly with respect to the provision of an efficient seal between the stationary part and the rotatable part.

It is known practice to use packing rings, preferably of soft, elastic material of round or rectangular cross-section, and which may have a metallic support. Under pressure, such rings are compressed and deformed, whereby upon the expansion of their supporting surfaces under internal pressure, particularly at the points of relative rotation, free rotation between the parts is restricted, resulting in the generation of heat.

The object of the invention is the elimination of these disadvantages by the use of, in place of the packing or sealing ring of soft compressible material, of a sealing ring of solid construction having a sealing end formed with a sealing edge which, under pressure, abuts the rotatable part with a line sealing contact. This type of seal is considerably simpler, more versatile, has a longer life, and is generally superior. The rotatable part is freely rotatable, even under high operating pressures, and consequently operates without a tendency to undesirably generate heat.

The present seal also enables the production of a structure of small dimensions, with a simple separation between the stationary and rotatable parts to enable the rapid changing of a sealing ring by a simple disassembly operation. The rotary joint embodying the present invention thus is distinguished by its simplicity, its few individual parts, small dimensions, and attendant low production costs.

In the drawing, which illustrates an example of a swivel joint constructed in accordance with the invention, along with two examples of the form of the sealing elements employed, illustrating details thereof:

FIG. 1a illustrates the stationary body part of the joint, for example, having a straight pipe connection, with half being illustrated in elevation, and the other half in section;

FIG. 1b illustrates the corresponding rotatable body part having an L-pipe connection, and associated elements, likewise with half being illustrated in elevation, and the other half in section;

FIG. 2 illustrates, in enlarged partial section, the details of the ring-shaped sealing element; and FIG. 3 illustrates, likewise in enlarged partial section, a modified form of sealing element.

The assembly illustrated in FIG. 1b includes a stationary, axially thick ball-bearing race 1, of relatively large diameter having external threads 2 and an aligning collar 3, and a bearing member 4 which is provided with an axially thin ball-bearing race 5, and external threads 6.

The end of the member 4 is provided with a sealing edge 7, and the opposite end is provided with a guide journal or flange 8. The pipe connecting member 9, which with the bearing member 4 comprises the rotatable body part, is illustrated, for example, as being in the form of an L and is provided with internal threads into which is screwed the external threads 6 of the bearing member 4, with the bearing races 4 and 5 being oppositely disposed and having a series of bearing balls 10 interposed therebetween. The two members 9 and 4 are drawn tight to press the sealing edge 7 solidly and tightly against the shoulder 11 of the member 9, the latter being guided in the large bore 12 of the ball-bearing race 1. A cooperable dust ring 13 operatively extends between the members 1 and 9, to protect against the entry of dust, etc.

As illustrated in FIG. 1a, the body part or casing 1 is illustrated as being in the form of a straight pipe connection or coupling and is provided with internal threads 15 adapted to receive the threads 2 on the bearing race 1, and is formed with a cylindrical bore 16 adapted to receive the cooperable sealing elements, the passage 17 operatively connecting the member 9 with the opposite end of the member 14 and a pipe connected thereto.

FIGS. 2 and 3 illustrate, in enlarged partial section, respective forms of the annular sealing structure and the cooperation of the various parts thereof. Both figures illustrate a portion of the member 14 and the cylindrical bore 16 therein. Disposed in the bore 16 and extending between the adjacent portion of the member 14 and the bearing member 4 of the rotatable body part is an annular or ring-shaped sealing member 18 in FIG. 2, or 18a in FIG. 3, the respective sealing members being sealed with respect to the bore 16 by sealing or packing rings 19 which bear tightly on the cylindrical wall of the bore. An auxiliary force is applied to the sealing member 18 or 18a, which in the examples illustrated, comprises a circular or ring-shaped spring 20 formed from relatively flat spring stock, which is operative, in the construction of FIG. 2, to urge the annular edge 21 of the sealing member 18 into engagement with the hard, smooth end surface 8a of the guide flange or journal 8, or in the construction of FIG. 3, to urge the sealing edge 21a formed on the sealing member 18a, into engagement with the sealing face 4a on the bearing member 4, thus assuring a constant, highly efficient seal between the stationary and rotatable parts of the joint.

The sealing members or rings 18 and 18a, respectively, may consist of suitable, solid, noncompressible material having a low coefficient of friction, such as, for example, fiber, hard polyamide such as nylon, plastic, bronze or the like, especially, materials having self-lubricating properties. In the construction of FIG. 2, the sealing edge 21 is of triangular or wedge-shaped cross-section bearing against the hard, smooth, radially extending flat bearing surface 8a of the bearing flange 8, while in the construction of FIG. 3, the sealing edge 21a, formed by the offset end configuration, bears against the concave conical annular shaped bearing surface 4a on the bearing member 4.

It will be appreciated that the inventive concept is directed to the formation of a line contact between the sealing elements, and instead of the sealing edge being sharp, as illustrated, it may be rounded or divided, the sealing engagement then taking place in a somewhat wider line. Likewise, the sealing edge and cooperable sealing surface may be reversed, and a convex conical surface could be employed instead of the concave surface illustrated. The sealing edge, however, should abut the sealing surface in a circular line contact. Thus, the construction does not impair the free running of the bearing member. The diameter of the circular line of sealing contact may be increased or decreased, keeping in mind that the effective pressure on the sealing edge will be increased with a reduction in diameter, and decreased as the diameter is increased. Thus it is possible to readily design suitable seals for use with specific materials, under particular operating conditions. It is particularly desirable that the sealing surface be hard and polished, whereby, especially with the use of sealing rings of polyamides, a practically unlimited seal life may be achieved. Sealing rings of bronze are especially suited for high pressures and temperatures.

The auxiliary force, for example, the ring-shaped spring 20, functions to apply a suitable pressure at the sealing edge to insure proper sealing until the pressure of the conveyed medium is applied thereto. The spring pressure should be strong enough to insure that no leakage will occur in the event of a pressure in the line less than atmospheric.

It will be appreciated that the construction can readily and easily be disassembled, to permit the replacement of a sealing ring, by merely unscrewing the member 1 from the body part 14, without requiring special tools or the like.

Changes may be made within the scope and spirit of the appended claims which define what is believed to be new and desired to have protected by Letters Patent.

We claim:

1. A ball-bearing swivel joint for fluid lines, comprising a first and a second connecting structure which are constructed for connection to respective elements of the line in which the joint is to be inserted, said connecting structures being rotatable relative to each other, each of said structures comprising a line-connecting member and a bearing member, each bearing member being of tubular form and having external threads formed at one axial end thereof engaged with cooperable internal threads formed in a bore of the associated connecting member to form respective rigid unitary structures, with one end of the first structure being concentrically disposed within one end of the second structure and said bearing members being disposed in concentric relation, the inner bearing member having an outwardly directed annular flange and the outer bearing member having an inwardly directed annular flange, forming opposed radially extending bearing races disposed to oppose separating movement between the two connecting structures, a plurality of bearing balls disposed between said bearing races, said inner bearing member and the associated connecting member being provided thereon with cooperable sealing means forming a fluid-tight seal therebetween, the inner end of said inner bearing member having a hard, smooth surface of generation forming one end of an annular space defined thereby and the connecting member of said second connecting structure, an annular sealing member disposed in said last-mentioned annular space, formed from a non-compressible material having a low coefficient of friction, and having an annularly shaped portion bearing in sealing relation on said hard, smooth surface of said inner bearing member, radially extending means on said sealing member forming a fluid-tight seal between the latter and an inner wall of the connecting member of said second connecting structure, thereby forming a rotary fluid-tight seal between the two connecting structures, and means disposed between and engageable with said sealing member and the connecting member of said second connecting structure for exerting an auxiliary force on said sealing member to maintain it in sealing relation irrespective of operative internal fluid pressure within the joint, said outer bearing member having externally accessible means for facilitating disconnection of the latter from the associated connecting member to enable access to said sealing member.

2. A ball-bearing swivel joint as defined in claim 1, wherein said hard, smooth surface of said inner bearing member is planar and the annularly shaped bearing portion of said sealing member has a wedge-shaped radial cross-section.

3. A ball-bearing swivel joint as defined in claim 1, wherein said hard, smooth surface of said inner bearing member has a concave conical configuration and the annularly shaped bearing portion of said sealing member is planar.

References Cited

UNITED STATES PATENTS

| | | | |
|---|---|---|---|
| 996,446 | 6/1911 | Anderson | 277—96 X |
| 1,366,634 | 1/1921 | Clark | 285—276 |
| 2,165,626 | 7/1939 | Ford | 285—334.5 X |
| 2,394,715 | 2/1946 | Phillips | 285—98 |
| 2,407,745 | 9/1946 | Jacobson | 285—278 |
| 2,421,974 | 6/1947 | Vandervoort | 285—281 X |
| 2,498,915 | 2/1950 | Espegren | 285—274 |
| 2,872,217 | 2/1959 | May | 285—98 X |

FOREIGN PATENTS 1,117,366   2/1956   France.

CARL W. TOMLIN, *Primary Examiner.*

D. W. AROLA, *Assistant Examiner.*